3,636,094
NORBORNANECARBOXYLIC ACID AMIDES OF
ANTHRANILIC ACID
Peter Yonan, Morton Grove, Ill., assignor to
G. D. Searle & Co., Chicago, Ill.
No Drawing. Filed July 25, 1969, Ser. No. 845,042
Int. Cl. C07c 103/30
U.S. Cl. 260—518 R                8 Claims

ABSTRACT OF THE DISCLOSURE

Amides wherein the nitrogen is part of an anthranilic acid system and the carbonyl is part of a norbornane- or norbornene-carboxylic acid system are described herein. The compounds are active against a variety of organisms including bacteria, protoza, fungi, and algae. They are also useful as anti-inflammatory agents and anti-atherogenic agents.

The present invention relates to a group of amides based on anthranilic acids and a norbornanecarboxylic acid or norbornenecarboxylic acid. In particular, it relates to a group of compounds having the following general formula

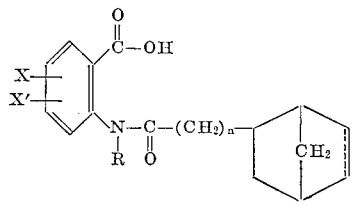

wherein the dashed line indicates the optional presence of a double bond; $n$ is a whole number between 0 and 1 inclusive; R is selected from the group consisting of hydrogen and methyl; X and X' are each selected from the group consisting of hydrogen, halogen, methyl, or methoxy, or they can be combined as a carbon chain to form a second aromatic ring fused to the original benzene ring. In the case where X and X' serve to form a second aromatic ring, a naphthalene ring structure results. The halogen atoms referred to above include fluorine, chlorine, bromine, and iodine. Two isomeric forms are possible for the substituted norbornanes and norbornenes described herein. These are referred to as exo- and endo-isomers. The present invention comprehends both the exo- and the endo-isomers and also mixtures of the two isomers.

The compounds of the present invention are conveniently prepared by the reaction of anthranilic acid or a substituted anthranilic acid with the approriate norbornane- or norbornenecarboxylic acid chloride. The reaction is usually carried out in an inert solvent such as chloroform in the presence of a tertiary amine such as triethylamine. The application of external heat is not ordinarily necessary for the reaction to take place.

The compounds of the present invention are useful because of their anti-biotic activity against a variety of organisms. Thus, they inhibit the growth of bacteria such as *Diplococcus pneumoniae* and *Bacillus subtilis*, protozoa such as *Tetrahymena gelleii*, *Trichomonas vaginalis*, and *Tetrahymena pyriformis*, fungi such as *Trichophyton mentagrophytes*, and algae such as *Chlorella vulgaris*. The present compounds can thus be combined with various known excipients and adjuvants in the form of dusts, solutions, suspensions, ointments, and sprays to provide compositions useful for disinfecting purposes.

Evidence of the anti-protozoal utility of the present compounds is provided by a standardized test for their capacity to inhibit the growth of *Trichomonas vaginalis* which is carried out in the following manner. A modified Diamond medium is prepared by mixing 1200 parts of trypticase (Baltimore Biological Laboratories), 600 parts of yeast extract (Disco), 300 parts of maltose, 60 parts of L-cysteine hydrochloride, 12 parts of L-ascorbic acid, 48 parts of dibasic potassium phosphate, 48 parts of monobasic potassium phosphate, and 54,000 parts of distilled water. The pH is adjusted to 6.8 with 4% sodium hydroxide solution and 30 parts of agar (Baltimore Biological Laboratories) is incorporated. The mixture is boiled for one minute to dissolve the agar and it is then sterilized in an autoclave. To 80 volumes of the resultant medium is aseptically added 20 volumes of sterile Dubos medium serum. The resultant medium is inoculated with 1% (by volume) of a 72-hour culture of *T. vaginalis*, whereupon 1 ml. of the inoculated medium is mixed with 10 mg. of test compound. The mixture is incubated anaerobically at 37° C. for 48 hours and then examined microscopically for the presence of motile trichomonads. If any are observed, the compound is considered inactive. If no motile trichomonads are observed, 0.1 ml. of the incubated mixture is serially diluted and mixed with additional quantities of the inoculated medium sufficient to produce concentrations of 1000, 100, 10, and 1 microgram of test compound per ml., and the resultant mixtures are incubated anaerobically as before at 37° C. for 48 hours and then examined microscopically for the presence of motile trichomonads. Controls are provided by concurrent incubations identical with the foregoing except for the absence of test compound. When 5-methyl-N-(5-norbornene-2-carbonyl)anthranilic acid, 4-chloro-N-(norbornane-2-carbonyl)anthranilic acid, 5 - iodo - N-(5-norbornene-2-carbonyl)anthranilic acid, and 4,5-dimethoxy-N-(5-norbornene - 2 - carbonyl)anthranilic acid were tested against *Trichomonas vaginalis* by the above procedure, each inhibited the protozoa at a concentration of 1000 micrograms per milliliter or less.

Further evidence of the anti-protozoal utility of the present compounds is provided by a standardized test for their capacity to inhibit the growth of *Tetrahymena pyriformis* which is carried out in the following manner. A solution is prepared from 24 grams of proteose peptone, 16 grams of sucrose and 1000 ml. of distilled water. 0.5 ml. of this solution is inoculated with 10% of a 4 to 7 day old culture of *Tetrahymena pyriformis* and the resultant mixture is added to 0.5 ml. of a solution or suspension containing 2000 micrograms of test compound per milliliter of solution. The resultant mixture is incubated at room temperature for 48 hours and then examined microscopically for the presence of motile protozoa. If any are observed, the compound is considered inactive at a concentration of 1000 micrograms per milliliter. If no motile protozoa are observed, 0.1 ml. of the solution or suspension is transferred from the original vial to 0.9 ml. of a solution which is prepared from 12 grams of proteose peptone, 8 grams of sucrose, and 1000 ml. of distilled water and which has been inoculated with 5% of a 4 to 7 day old culture of *Tetrahymena pyriformis* and the resultant mixture is thoroughly mixed. 0.1 ml. of this preparation is transferred similarly to a second vial of inoculated medium and, after mixing, 0.1 ml. of this new preparation is similarly transferred to a third vial. The resultant mixtures are incubated as before and examined microscopically for the presence of motile protozoa. The resulting solutions contain the test compounds at concentrations of 100, 10, and 1 microgram per milliliter, respectively. Controls are provided by concurrent incubations identical wtih the foregoing except for the absence of test compound. When N-(5-norbornene-2-carbonyl)anthranilic acid, 5-chloro-N-(norbornane-2-carbonyl)anthranilic acid, 4-chloro-N-(5-norbornene-2-carbonyl)anthranilic acid, and 3-(5-norbornene-2-carboxamido)-2-naphthoic acid were tested by the above procedure, each inhibited the protozoa at a concentration of 100 micrograms per milliliter or less.

The compounds of the present invention are also useful as anti-atherogenic agents. More specifically, the compounds reduce cholesterol and triglycerides in the blood. This is demonstrated by a test procedure in which groups of 8 rats are fed for five days with 4 grams of test compound given as 0.2% of their feed. At the end of this period, blood samples are analyzed for cholesterol and triglyceride content. The results obtained are compared statistically wtih those for a control group of animals to determine if there is a significant decrease in the indicated materials. In this test, 5-chloro-N-(5-norbornene-2-carbonyl)anthranilic acid, 5-bromo-N-(5-norbornene-2-carbonyl)anthranilic acid, 5-iodo-N-(5-norbornene-2-carbonyl)anthranilic acid, and 5-methyl-N-(5-norbornene-2-carbonyl)anthranilic acid were each found to produce a significant reduction in cholesterol and triglycerides.

The present compounds are also useful as anti-inflammatory agents. Thus, they produce a phenylbutazone-like effect on edematous conditions.

The following examples are presented to further illustrate the present invention. If a product is not referred to specifically as exo or endo, then it is a mixture of the two isomers. In addition, in the examples, quantities are indicated in part by weight and temperatures in degrees centigrade (° C.).

EXAMPLE 1

To a suspension of 8.5 parts of 5-chloroanthranilic acid in 150 parts of chloroform is added 10 parts of triethylamine. To the solution which results is added a solution of 8.0 parts of 5-norbornene-2-carbonyl chloride in 45 parts of chloroform portionwise at room temperature with stirring. After the addition is complete, the mixture is stirred for an additional two hours before it is poured into dilute hydrochloric acid. Two layers form and the chloroform layer is separated, dried, and concentrated to a small volume. Then, hot hexane is added to the chloroform concentrate and the mixture is allowed to stand. The crystals which form are separated by filtration and recrystallized from a mixture of tetrahydrofuran and hexane to give 5-chloro-N-(5-norbornene-2-carbonyl)anthranilic acid melting at about 184–185° C. This compound has the following formula

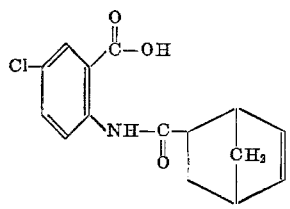

EXAMPLE 2

To a suspension of 8.5 parts of 5-chloroanthranilic acid in 150 parts of chloroform there is added 10 parts of triethylamine to give a solution. To this solution there is added portionwise, at room temperature with stirring, a solution of 8.0 parts of 2-norbornanecarbonyl chloride in 45 parts of chloroform. Stirring is continued for 2 hours after the addition is complete and the mixture is then poured into dilute hydrochloric acid. A precipitate forms but ether and some tetrahydrofuran are added to the mixture to solubilize the precipitate. The organic layer is then separated, dried, and concentrated to a small volume. Hot hexane is added to the concentrate which is then allowed to stand. The crystalline precipitate which forms is separated by filtration and recrystallized from a mixture of tetrahydrofuran and hexane to give 5-chloro-N-(2-norbornanecarbonyl)anthranilic acid melting at about 200–202° C.

EXAMPLE 3

The procedure of Example 1 is repeated using an equivalent quantity of anthranilic acid in place of the 5-chloroanthranilic acid. In this case, the product is N-(5-norbornene-2-carbonyl)anthranilic acid melting at about 150–151° C. after recrystallization from a mixture of chloroform and hexane.

Similarly, N-methylanthranilic acid is reacted with 5-norbornene-2-carbonyl chloride according to the procedure described in Example 1. The product obtained is N-methyl-N-(5-norbornene-2-carbonyl)anthranilic acid melting at about 122–124° C. after recrystallization from a mixture of ether and hexane. This compound has the following formula

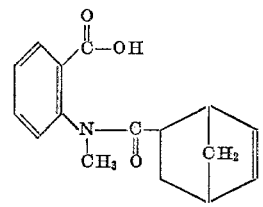

EXAMPLE 4

3-methylanthranilic acid and 5-methylanthranilic acid are each reacted with 5-norbornene-2-carbonyl chloride according to the procedure described in Example 1. The products obtained are, respectively, 3-methyl-N-(5-norbornene-2-carbonyl)anthranilic acid melting at about 178–179° C. after recrystallization from a mixture of chloroform and ether, and 5-methyl-N-(5-norbornene-2-carbonyl)anthranilic acid melting at about 176–177° C. after recrystallization from a mixture of tetrahydrofuran and hexane.

EXAMPLE 5

An equivalent quantity of 5-bromoanthranilic acid is substituted for the 5-chloroanthranilic acid and the procedure of Example 1 is repeated to give 5-bromo-N-(5-norbornene-2-carbonyl)anthranilic acid melting at about 197–198° C. after recrystallization from a mixture of chloroform and hexane.

Likewise, if an equivalent quantity of 5-iodoanthranilic acid is substituted for the 5-chloroanthranilic acid and the procedure of Example 1 is repeated, the product obtained is 5-iodo-N-(5-norbornene-2-carbonyl)anthranilic acid melting at about 207–209 °C. after recrystallization from a mixture of tetrahydrofuran and hexane.

Similarly, 5-fluoroanthranilic acid is reacted with 5-norbornene-2-carbonyl chloride to give 5-fluoro-N-(5-norbornene-2-carbonyl)anthranilic acid.

EXAMPLE 6

4,5-dimethoxyanthranilic acid is reacted with 5-norbornene-2-carbonyl chloride according to the procedure described in Example 1 to give 4,5-dimethoxy-N-(5-norbornene-2-carbonyl)anthranilic acid melting at about 221–222° C. after recrystallization from a mixture of tetrahydrofuran and hexane.

Similarly, 3-amino-2-naphthoic acid is reacted with 5-norbornene-2-carbonyl chloride according to the procedure described in Example 1 to give 3-(5-norbornene-2-carboxamido)-2-naphthoic acid melting at about 210–211° C. after recrystallization from a mixture of tetrahydrofuran and pentane. This compound has the following formula

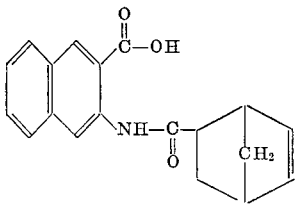

EXAMPLE 7

5-chloroanthranilic acid is reacted with endo-5-norbornene-2-carbonyl chloride according to the procedure described in Example 1 to give 5-chloro-N-(endo-5-norbornene-2-carbonyl)anthranilic acid melting at about 180–181° C. after recrystallization from a mixture of tetrahydrofuran and hexane.

Similarly, 5-chloroanthranilic acid is reacted with exo-5-norbornene-2-carbonyl chloride to give 5-chloro-N-(exo-5-norbornene-2-carbonyl)anthranilic acid melting at about 198–199° C. after recrystallization from a mixture of tetrahydrofuran and hexane.

EXAMPLE 8

The procedure of Example 2 is repeated using 4-chloroanthranilic acid in place of the 5-chloroanthranilic acid. In this case, the product is 4-chloro-N-(2-norbornanecarbonyl)anthranilic acid melting at about 224–225° C. after recrystallization from a mixture of ether and hexane.

Similarly, the procedure of Example 2 is repeated using an equivalent quantity of 2-norbornaneacetyl chloride in place of the 2-norbornanecarbonyl chloride. The product obtained is 5-chloro-N-(2-norbornaneacetyl)anthranilic acid melting at about 193–194° C. after recrystallization from a mixture of tetrahydrofuran and hexane. The 2-norbornaneacetyl chloride used above is obtained by the reaction of 2-norbornaneacetic acid with thionyl chloride.

EXAMPLE 9

4-chloroanthranilic acid is reacted with 5-norbornene-2-carbonyl chloride according to the procedure described in Example 2 to give 4-chloro-N-(5-norbornene-2-carbonyl)anthranilic acid melting at about 211–213° C. after recrystallization from a mixture of tetrahydrofuran and hexane.

Similarly, 3,5-dichloroanthranilic acid is reacted with 5-norbornene-2-carbonyl chloride according to the procedure described in Example 2 to give 3,5-dichloro-N-(5-norbornene-2-carbonyl)anthranilic acid melting at about 164–165° C. after recrystallization from a mixture of ether and hexane.

What is claimed is:
1. A compound of the formula

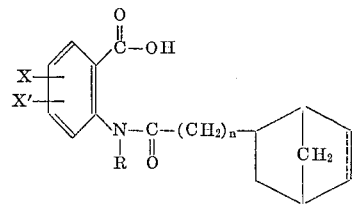

wherein the dashed line indicates the optional presence of a double bond; $n$ is a whole number between 0 and 1 inclusive; R is selected from the group consisting of hydrogen and methyl; and X and X' are selected from the group consisting of hydrogen, halogen, methyl, methoxy, and, when the two are combined, 1,3-butadienylene.

2. A compound according to claim 1 which has the formula

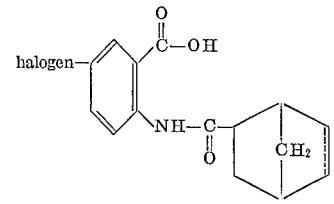

wherein the dashed line indicates the optional presence of a double bond.

3. A compound according to claim 1 which has the formula

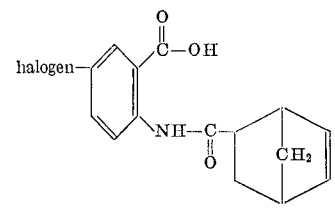

4. A compound according to claim 1 which is 4-chloro-N-(5-norbornene-2-carbonyl)anthranilic acid.
5. A compound according to claim 1 which is 5-chloro-N-(5-norbornene-2-carbonyl)anthranilic acid.
6. A compound according to claim 1 which is 5-chloro-N-(2-norbornanecarbonyl)anthranilic acid.
7. A compound according to claim 1 which is 5-bromo-N-(5-norbornene-2-carbonyl)anthranilic acid.
8. A compound according to claim 1 which is 5-methyl-N-(5-norbornene-2-carbonyl)anthranilic acid.

References Cited
UNITED STATES PATENTS
3,313,848  4/1967  Scherrer et al. _____ 260—518 A LORRAINE A. WEINBERGER, Primary Examiner L. A. THAXTON, Assistant Examiner U.S. Cl. X.R.

260—518 A, 519; 424—319